United States Patent [19]

Gullapalli et al.

[11] Patent Number: 5,448,000

[45] Date of Patent: Sep. 5, 1995

[54] END-QUENCHING THE LIVING POLYMERIZATION OF ISOBUTYLENE WITH ACETYL SULFATE

[75] Inventors: Pratap Gullapalli, La Habra, Calif.; John P. Heller, Socorro, N. Mex.

[73] Assignee: New Mexico Tech Research Foundation, Socorro, N. Mex.

[21] Appl. No.: 197,972

[22] Filed: Feb. 17, 1994

[51] Int. Cl.⁶ .......................... C08F 8/36; C08F 2/38
[52] U.S. Cl. .................................. 526/85; 525/333.7; 525/333.9; 525/353; 525/383; 526/133; 526/348.7
[58] Field of Search ................... 525/333.7, 333.9; 526/85

[56] References Cited

U.S. PATENT DOCUMENTS

| | | |
|---|---|---|
| 3,836,511 | 9/1974 | O'Farrell et al. |
| 4,105,647 | 8/1978 | O'Farrell et al. ............. 526/33 |
| 4,119,616 | 10/1978 | O'Farrell ...................... 526/31 |
| 4,157,432 | 6/1979 | Lundberg et al. ............ 526/31 |
| 4,184,988 | 1/1980 | Makowski et al. |
| 4,276,394 | 6/1981 | Kennedy et al. ............. 525/245 |
| 4,303,766 | 12/1981 | O'Farrell et al. ............. 525/353 |
| 4,342,849 | 8/1982 | Kennedy ...................... 525/333.7 |
| 4,393,199 | 7/1983 | Manser ......................... 528/408 |
| 4,617,337 | 10/1986 | Lundberg et al. ............ 524/399 |
| 4,758,631 | 7/1988 | Kennedy et al. ............. 525/245 |
| 4,906,705 | 3/1990 | Peng et al. ................... 525/333.7 |
| 4,910,321 | 3/1990 | Kennedy et al. ............. 549/213 |
| 4,929,683 | 5/1990 | Kennedy et al. ............. 525/268 |
| 4,939,184 | 7/1990 | Kennedy et al. ............. 521/170 |
| 5,039,752 | 8/1991 | Storey et al. ................. 525/314 |
| 5,066,730 | 11/1991 | Kennedy et al. ............. 525/319 |
| 5,122,572 | 6/1992 | Kennedy et al. ............. 525/314 |
| 5,219,948 | 6/1993 | Storey .......................... 525/314 |
| 5,336,745 | 8/1994 | Cheradame ................... 526/347.1 |

OTHER PUBLICATIONS

Storey et al., "Sulfonation of tert-Alkyl Chlorides: Application to the tert-Chloride-Terminated Polyisobutylene System," *J. Poly. Sci., Part A, Poly Chem.*, vol. 29, pp. 317–325 (1991).

Storey et al., "Sulfonation of tert-Alkyl Chlorides: Application to the tert-Cloride-Terminated Polyisobutylene System," *ACS: Polymer Preprints* pp. 593–594 (1991).

Tant, et al., "Sulfonated Polyisobutylene Telechelic Ionomers. XIV. Viscoelastic Behavior of Concentrated Solutions in Nonpolar Solvents," *J. Appl. Poly. Sci.*, vol. 42, pp. 523–532 (1991).

Tant, et al., "Sulfonated Polyisobutylene Telechelic Ionomers. XIII. Viscosity Behavior in Nonpolar Solvents and Nonpolar–Polar Solvent Mixtures," *J. Appl. Poly. Sci.*, vol. 37, pp. 2873–2895 (1989).

Tant, et al., "Sulfonated Polyisobutylene Telechelic Ionomers. 10. Effects of Architecture and Molecular Weight on Viscosity Behavior in a Nonpolar Solvent," *Poly. Bull.*, vol. 13, pp. 541–548 (1985).

Kennedy, et al., "New Telechelic Polymers and Sequential Copolymers by Polyfunctional Initiator--Transfer Agents (Inifers). II. Synthesis and Characterization of $\alpha,\omega$-Di(tert-Chloro)polyisobutylenes," *J. Poly. Sci., Poly. Chem Ed.*, vol. 18, pp. 1523–1537 (1980).

Kennedy, et al., "End–Quenching and End–Functionalizing in Living Carbocaitionic Polymerization," *Polym. Prepr.*, vol. 33, No. 1, p. 903 (1992).

Mohajer, et al., "New Polyisobutylene Based Model Ionomers. 3. Further Mechanical and Structural Studies," *Poly. Bull.*, vol. 8, pp. 47–54 (1982).

Mohajer, et al., "New Polyisobutylene–Based Model Elastomeric Ionomers. VI. The Effect of Excess Neutralizing Agents on Solid–State Mechanical Properties," *J. Appl. Poly. Sci.*, vol. 29, pp. 1943–1950 (1984).

(List continued on next page.)

*Primary Examiner*—Fred Zitomer
*Attorney, Agent, or Firm*—Jeffrey D. Myers; Deborah A. Peacock; Donovan F. Duggan

[57] ABSTRACT

A one-pot method of preparing sulfonic acid-terminated polyisobutylene by sulfonation with acetyl sulfate of living polyisobutylene in a single step. The method permits preparation of sulfonated telechelic polyisobutylenes (STPs) by "inifer" initiated carbocationic polymerization of isobutylene with Lewis acid to form a polymer, followed by the addition in the same reaction vessel of acetyl sulfate at the polymerization temperature or the decomposition temperature of the complex.

8 Claims, 3 Drawing Sheets

OTHER PUBLICATIONS

Nuyken, et al., "Telechelics by Carbocationic Techniques," Textbook of CRC Press, Inc., Boca Raton, Fla., Eric J. Goethals, Ph.D., ed., pp. (109–111).

Ivan, et al., "Living Carbocationic Polymerization, XXX, One-Pot Synthesis of Allyl-Terminated Linear and Tri-Arm Star Polyisobutylenes, and Epoxy- and Hydroxy-Telechelics Therefrom," *J. Poly. Sci., Part A, Poly. Chem.*, vol. 28, pp. 89–104 (1990).

Jerome, et al., "Telechelic Polymers: Synthesis, Characterization and Applications," *Prog. Polym. Sci.*, vol. 16, pp. 837–906 (1991).

Kaszas, et al., "Electron Pair Donors in Carbocationic Polymerizatio. I. Introduction Into the Synthesis of Narrow Molecular Weight Distribution Polyisobutylenes" *Poly. Bull.*, vol. 20, pp. 413–419 (1988).

Kennedy, et al., "Designed Polymers by Carbocationic Macromolecular Engineering: Theory and Practice," Textbook published by Hanser Publishers, Munich Vienna, New York, Barcelona (1982), pp. 142–143, 190–191.

Kennedy, et al., "New Polyisobutylene-Based Ionomers: Synthesis and Model Experiments," *Org. Coat. Appl. Polym. Sci.*, vol. 46, pp. 182–185 (1982).

Bagrodia, et al., "New Polyisobutylene-Based Model Ionomers. 5. The Effect of Molecular Weight on the Mechanical Properties of Tri-Arm-Star Polyisobutylene-Based Model Ionomers," *Poly. Bull.*, vol. 9, pp. 174–180 (1983).

Bagrodia, et al., "New Polyisobutylene-Based Model Ionomers. IV. Strain Induced Crystallization of Low Molecular Weight Model Ionomers," *Poly. Bull.*, vol. 8, pp. 281–286 (1982).

Faust, et al., "Living Carbocationic Polymerization. III. Demonstration of the Living Polymerization of Isobutylene," *Poly. Bull.*, vol. 15, pp. 317–323 (1986).

Faust, et al., "Living Carbocationic Polymerization. IV Living Polymerization and Isobutylene," *J. Poly. Sci, Part A, Poly. Chem.*, vol. 25, pp. 1847–1869 (1987).

Gullapalli, et al., "Electron-Pair Donors in Carbocationic Polymerization: Synthesis of Linear Living $\alpha$,-$\omega$-Di(tert-chloro)polyisobutylenes," *J. Poly. Sci., Part A, Poly. Chem.*, vol. 39, pp. 163–168 (1992).

Bagrodia, et al., "Sulphonated Polyisobutylene Telechelic Ionomers: 12. Solid-State Mechanical Properties," *Polymer*, vol. 28, pp. 2207–2226 (Dec. 1987).

Bagrodia, et al., "New Polyisobutylene-Based Model Elastomeric Ionomers: Rheological Behavior," *Poly. Eng. and Sci.*, vol. 28, No. 10, pp. 662–672 (May 1986).

Bagrodia, et al., "New Polyisobutylene-Based Model Elastomeric Ionomers, VIII. Thermal-Mechanical Analysis," *J. Appl. Poly. Sci.*, vol. 30, pp. 2179–2193 (1985).

Bagrodia, et al., "Melt Rheology of Ion-Containing Polymers. I. Effect of Molecular Weight and Excess Neutralizing Agent in Model Elastomeric Sulfonated Polyisobutylene-Based Ionomers," *J. Appl. Poly. Sci.*, vol. 29, pp. 3065–3073 (1984).

Bagrodia, et al., "Ionomers (Comments on the Effect of Cation, Type on Ionomer Properties," *Poly. Bull.*, vol. 12, pp. 369–392 (1984).

Initiator (I) + Coinitiator + Isobutylene

| Polymerization (<1h)

| Removal of solvent, BCl$_3$
| Purification (add Hexane,
| precipitation with Methanol)
| Drying (MgSO$_4$)
| Filtering, Rotavap
↓ Drying in vacuo

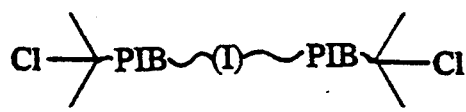

| Dissolve in dry THF
| Add strong base (t-BuOK)
| Separation (Hexane)
| Drying (MgSO$_4$)
↓ Filtering, Rotavap

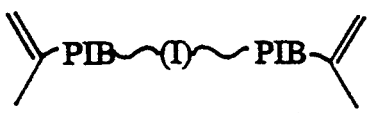

| Acetyl sulfate/Hexane
| Separation, Precipitation with
| Methanol or Acetone
↓ Drying in vacuo

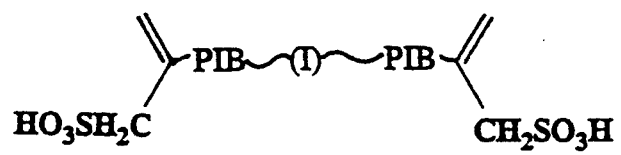

Figure 1

Initiator (I) + Coinitiator + Isobutylene

| Polymerization (<1h)

Quenching with excess
Acetyl sulfate

Separation
Rotavap
Precipitation with
Methanol or Acetone
Drying in vacuo

END-QUENCHING THE LIVING POLYMERIZATION OF ISOBUTYLENE WITH ACETYL SULFATE

BACKGROUND OF THE INVENTION

1. Field of the Invention (Technical Field)

The present invention relates to methods of preparing sulfonic acid-terminated polyisobutylenes, particularly sulfonated telechelic polyisobutylenes (STPs).

2. Background Art

Telechelic ionomers, which bear ionic groups only at the ends of non-polar polymer chains, have received enormous interest as they display unique properties in bulk and solutions. Interest in the properties of ionomer solutions is justified by the many potential applications including viscosity controlling agents and gelling agents for tertiary oil recovery. The presence of ionic groups, specifically at the ends of polymer chains of nonpolar nature, has significant effect upon polymer properties as a consequence of ionic aggregation.

In a series of publications over a decade, J.P. Kennedy and others have demonstrated the importance of both linear $\alpha$, $\omega$- difunctional and trifunctional star STP ionomers. To date, the STP ionomers represent the most versatile telechelic ionomers and there still persists a great demand for such ionomers. For example, these ionomers are of interest for theoretical purposes, as viscosity controlling agents, as elastomers, and as thermoplastics. To date, however, the preparation of STPs is neither simple nor economical.

STPs are presently synthesized by either of the multistep procedures shown in FIGS. 1 and 2. Both are unsatisfactory.

The prior art process of FIG. 1 requires a laborious and expensive dehydrochlorination reaction of the prepolymers end-capped with tert-chloro groups. References presenting the procedure of FIG. 1 include Kennedy and Storey, "New Polyisobutylene-Based Ionomers: Synthesis and Model Experiments," *Org. Coat. Appl. Polym. Sci.* 46:182-85 (1981) and Mohajer, et al., "New Polyisobutylene Based Ionomers: 3. Further Mechanical and Structural Studies," *Polym. Bull.* 8:47-54 (1982).

The prior art process of FIG. 2 eliminates the dehydrochlorination reaction but still requires the preparation and processing of tert-chloro terminated prepolymer. References presenting the procedure of FIG. 2 include Storey, et al., "Sulfonation of tert-Alkyl Chlorides: Application to the tert-chloride-Terminated Polyisobutylene System," *J. Polym. Sci.: Part A: Polym. Chem.* 29:317-25 (1991) and Storey, et al., "Sulfonation of tert-Alkyl Chlorides: Application to the tert-chloride-Terminated Polyisobutylene System," *ACS Polym. Prepr.* 1991:593-94.

In a 1992 publication, Kennedy admits that efforts to that date to end-quench living polyisobutylene without creating tert-chloro groups had been unsuccessful with various quenching agents such as esters, ketones, ethers, anhydrides, dimethylacetamide, dimethylsulfoxide, and alkyl aluminums. Kennedy, et al., *Designed Polymers by Carbocationic Macromolecular Engineering: Theory and Practice* 142-43 (1992).

Faust and Kennedy, "Living Carbocationic Polymerization: III. Demonstration of the Living Polymerization of Isobutylene," *Polym. Bull.* 15:317-23 (1986), discloses living carbocationic polymerization of isobutylene and quenching the living recipe with methanol and other reagents such as amines or by increasing the temperature above the decomposition of the propagating ester complex. See also Faust and Kennedy, "Living Carbocationic Polymerization: IV. Living Polymerization of Isobutylene," *J. Polym. Sci.: Part A: Polym. Chem.* 25:1847-69 (1987).

Kaszas, et al., "Electron-pair Donors in Carbocationic Polymerization: I. Introduction into the Synthesis of Narrow Molecular Weight Distribution Polyisobutylenes," *Polym. Bull.* 20:413-19 (1988) discloses the preparation narrow molecular weight distribution telechelic polyisobutylenes with tert-chloro end groups.

Kennedy, "End Quenching and End-Functionalization in Living Carbocationic Polymerization," *Polym. Prepr.* 33(1):903 (1992) and Ivan, et al., "Living Carbocationic Polymerization. III.: One-Pot Synthesis of Allyl-Terminated Linear and Tri-Arm Star Polyisobutylenes and Epoxy and Hydroxy-Telechelics Therefrom," *J. Polym. Sci., Part A: Polym. Chem.* 28:89-104 (1990) disclose one-pot end quenching of living polymerization of isobutylene, specifically the synthesis of various linear and three-arm star allyl-terminated telechelic polyisobutylenes.

The present invention is of a process of producing STPs without creating tert-chloro terminated groups and without the need for dehydrochlorination. The present invention is much simpler and more economical than prior art methods.

SUMMARY OF THE INVENTION (DISCLOSURE OF THE INVENTION)

The present invention is of a method of preparing sulfonic acid-terminated polyisobutylene, comprising: polymerizing isobutylene in the presence of an initiator, an electron donor, a solvent, and a Lewis acid to form a living polyisobutylene; and end-quenching the living polyisobutylene with a sulfur-containing compound. In the preferred embodiment, the end-quenching is performed with acetyl sulfate (with the molar ratio of polyisobutylene to acetyl sulfate is 1:1 or greater) at a temperature between approximately $-90°$ and $0°$ Celsius. The Lewis acid is preferably a metal halide such as boron trichloride or titanium tetrachloride. The initiator is preferably of the form $R_1-C(R)_2-X$, $X-(R)_2C-(CH_2)_n-C(R)_2-X$, a cyclohexane ring with at least one bond outside the ring to X, or a benzene ring with at least one bond outside the ring to X; where $R_1$ is selected from the group consisting of alkyl, alicyclic, and aromatic groups, each R is a methyl group, each X is selected from the group consisting of halogens, hydroxyls, acetates, and ethers, and n is an integer between one and three, inclusive. The solvent is preferably a chlorinated solvent, most preferably methylene chloride or methyl chloride, or an aliphatic or alicyclic hydrocarbon compound containing five to ten carbon atoms.

A primary object of the present invention is to provide both a simple and economical method of producing sulfonic acid-terminated polyisobutylenes.

A primary advantage of the present invention is that no tert-chloro terminated groups are created during the process of the invention.

Another advantage of the present invention is that dehydrochlorination is not required.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a diagram of a first prior art method of preparing sulfonic acid-terminated polyisobutylene, requiring dehydrochlorination;

DESCRIPTION OF THE PREFERRED EMBODIMENTS (BEST MODES FOR CARRYING OUT THE INVENTION)

The present invention is of a one-pot method of preparing sulfonic acid-terminated polyisobutylene by sulfonation with acetyl sulfate of living polyisobutylene in a single step. No formation of tert-chloride-terminated polyisobutylenes occurs and, concomitantly, no dehydrochlorination need occur.

Figure 2:
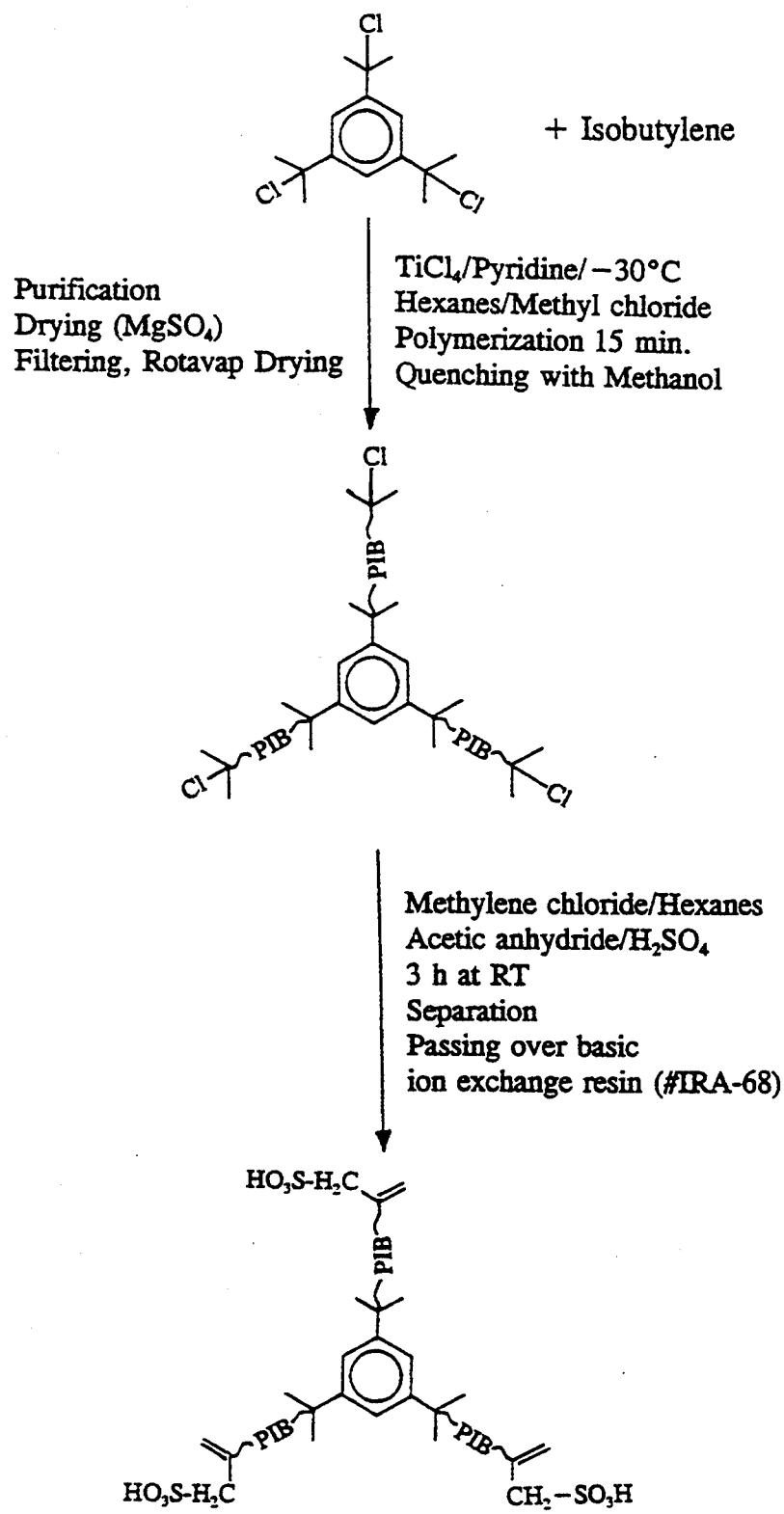
FIG. 2 is a diagram of a second prior art method of preparing sulfonic acid-terminated polyisobutylene, requiring formation of tert-chloro terminated groups.
Figure 3:
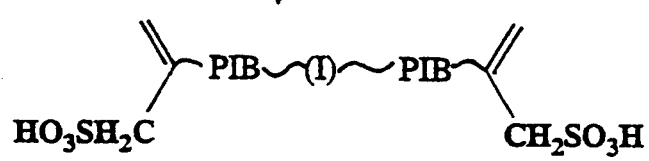
FIG. 3 is a diagram of the preferred method of the present invention for preparing sulfonic acid-terminated polyisobutylene.

The preferred process of the invention is shown in FIG. 3. Preferably, sulfonated telechelic polyisobtuylene (STPs) are prepared by the "inifer" initiated carbocationic polymerization of isobutylene with Lewis acid to form polymer (for preferably less than one hour), followed by the addition in the same reaction vessel of (end-quenching with) acetyl sulfate and precipitation by steam stripping or with methanol, ethanol, isopropyl alcohol, or acetone. The resulting polymer is dried in vacuo. The polymerization preferably occurs in a chlorinated solvent, most preferably in a mixture of solvents, such as methylene chloride, methyl chloride, or an aliphatic or alicyclic compound containing five to ten carbon atoms. The initiator is preferably a compound having the formula $R_1$—C(R)$_2$—X, X—(R)$_2$C—(CH$_2$)$_n$—C(R)$_2$—X,

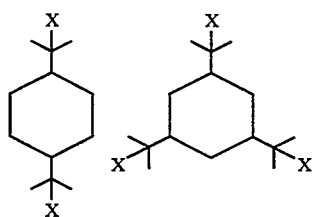

-continued

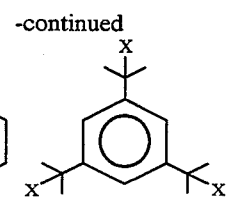

where $R_1$ is an alkyl, alicyclic, or aromatic group, R is a methyl group, and X is a halogen, hydroxyl, ester, ether, or siloxyl, and n is an integer between 1 and 3, inclusive. The Lewis acid can be, for example, boron trichloride or titanium tetrachloride, or other metal halide (including tin tetrachloride, aluminum chloride, or an alkyl aluminum). End-quenching preferably occurs at a temperature between $-90°$ to $0°$ Celsius, and most preferably at the polymerization temperature or at the decomposition temperature of the complex ($-10°$ to $0°$ Celsius). The molar ratio of polyisobutylene to acetyl sulfate is preferably 1:1 or greater.

The resulting polyisobutylene molecule is end-capped with sulfonic acid groups, which upon neutralization with metal hydroxides or metal acetates, are capable of conferring thickening and gelling properties in nonpolar solvents.

The present invention permits an efficient and economically viable one-pot synthesis of narrow molecular weight distributed living STP ionomers using electron donor-mediated living carbocationic polymerization of isobutylene followed by end-quenching with acetyl sulfate.

Industrial Applicability

The invention is further illustrated by the following nonlimiting example.

A 300 ml round bottom flask, equipped with a mechanical stirrer, thermometer, and a nitrogen inlet, was charged with 120 ml of anhydrous methylene chloride and 0.00034 moles of 1,4-di(2-hydroxy-2-propyl)cyclohexane initiator and equal concentration (0.00034 moles) of an electron donor, N,N-dimethylacetamide. The contents of the flask were cooled to $-50°$ Celsius. After about ten minutes of mixing, 0.28 moles of prechilled isobutylene were added to the flask. Polymerization was then initiated by the addition of 0.031 moles of boron trichloride. After 45 minutes of polymerization, prechilled acetyl sulfate in anhydrous methylene chloride (20 ml) was added slowly to the polymerization flask. Before quenching the living recipe with acetyl sulfate, a sample of the polymer was separately quenched with prechilled methanol. The contents of the polymerization flask were brought to room temperature with continuous vigorous stirring for about two hours. Stirring was stopped and the contents were allowed to separate. Clear methylene chloride layer was decanted and concentrated on a rotavapor. The concentrated polymer solution was then steam stripped with water, filtered, kneaded in acetone, and dried in a vacuum oven at $40°$ Celsius for two days.

The preceding example can be repeated with similar success by substituting the generically or specifically described reactants and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of preparing sulfonic acid-terminated polyisobutylene, the method comprising the steps of:
  a) polymerizing isobutylene in the presence of an initiator, an electron donor, a solvent, and a Lewis acid to form a living polyisobutylene; and
  b) end-quenching the living polyisobutylene with a sulfurcontaining compound, wherein the step of end-quenching comprises end-quenching with acetyl sulfate.

2. The method of claim 1 wherein the end-quenching step comprises end-quenching at a temperature between approximately $-90°$ and $0°$ Celsius.

3. The method of claim 1 wherein the molar ratio of polyisobutylene to acetyl sulfate is 1:1 or greater.

4. The method of claim 1 wherein the Lewis acid is a metal halide.

5. The method of claim 4 wherein the metal halide is selected from the group consisting of boron trichloride and titanium tetrachloride.

6. The method of claim 1 wherein the initiator is selected from the group of compounds having a formula selected from the group consisting of: $R_1-C(R)_2-X$, $X-(R)_2C-(CH_2)_n-C(R)_2-X$, a cyclohexane ring with at least one bond outside the ring to X, and a benzene ring with at least one bond outside the ring to X; where $R_1$ is selected from the group consisting of alkyl, alicyclic, and aromatic groups, each R is a methyl group, each X is selected from the group consisting of halogens, hydroxyls, acetates, and ethers, and n is an integer between one and three, inclusive.

7. The method of claim 1 wherein the solvent is selected from the group consisting of methylene chloride and methyl chloride.

8. The method of claim 1 wherein the solvent is selected from the group consisting of aliphatic and alicyclic hydrocarbon compounds containing five to ten carbon atoms.

* * * * *